United States Patent [19]

Gandrud et al.

[11] Patent Number: 4,705,220

[45] Date of Patent: Nov. 10, 1987

[54] GRANULAR APPLICATOR WITH INTERCHANGEABLE METERING WHEELS

[75] Inventors: Dale E. Gandrud; Ebenhard S. Gandrud, both of Owatonna, Minn.

[73] Assignee: Gandy Company, Owatonna, Minn.

[21] Appl. No.: 801,489

[22] Filed: Nov. 25, 1985

[51] Int. Cl.⁴ .............................................. A01C 7/12
[52] U.S. Cl. ..................................... 239/654; 111/77; 222/317; 406/70
[58] Field of Search ...................... 406/70; 111/34, 77; 222/317; 239/655, 674, 676, 654

[56] References Cited

U.S. PATENT DOCUMENTS

| | | |
|---|---|---|
| 1,051,958 | 2/1913 | Jones et al. |
| 1,161,369 | 11/1915 | Ayers ............................ 222/317 X |
| 1,270,577 | 6/1918 | Williams . |
| 1,556,850 | 10/1925 | Kühne ............................ 111/34 X |
| 3,048,132 | 8/1962 | Morgan et al. ...................... 111/77 |
| 3,411,467 | 11/1968 | Van der Lely et al. ......... 111/77 X |
| 4,212,566 | 7/1980 | Kao et al. . |
| 4,257,334 | 3/1981 | Mueller ............................ 222/317 X |
| 4,263,858 | 4/1981 | Dreyer ............................ 111/77 X |
| 4,379,664 | 4/1983 | Klein et al. . |
| 4,473,016 | 9/1984 | Gust . |
| 4,503,786 | 3/1985 | Tautfest . |
| 4,522,340 | 6/1985 | Gandrud . |

FOREIGN PATENT DOCUMENTS

| | | |
|---|---|---|
| 681729 | 3/1964 | Canada . |
| 1043173 | 11/1978 | Canada ............................... 111/77 |
| 2459470 | 7/1976 | Fed. Rep. of Germany ........ 111/34 |
| 2726915 | 12/1978 | Fed. Rep. of Germany ........ 111/34 |
| 2233807 | 2/1975 | France ............................... 111/77 |
| 634021 | 3/1950 | United Kingdom ......... 111/DIG. 4 |
| 2064491 | 6/1981 | United Kingdom ................... 111/34 |

Primary Examiner—Andres Kashnikow
Assistant Examiner—Mary Beth O. Jones
Attorney, Agent, or Firm—Merchant, Gould, Smith, Edell, Welter & Schmidt

[57] ABSTRACT

An improved, more versatile applicator (10) for precisely dispensing granular chemicals, fertilizers or seed, includes a hopper (14) with a metering assembly (40) mounted over a material discharge opening (34) in an inclined wall of the closed, convergent bottom end (18) of the hopper. The metering assembly (40), which is preferably removably secured to the hopper (14), includes a plurality of individual sets of metering wheels (64), receivers (56) and gate plates (60) for precise control and more tolerance to tilt. The metering assembly (40) is also adapted to facilitate thorough clean-out of the hopper (14) as well as removal and replacement of the metering wheels (64) without emptying the hopper.

19 Claims, 8 Drawing Figures

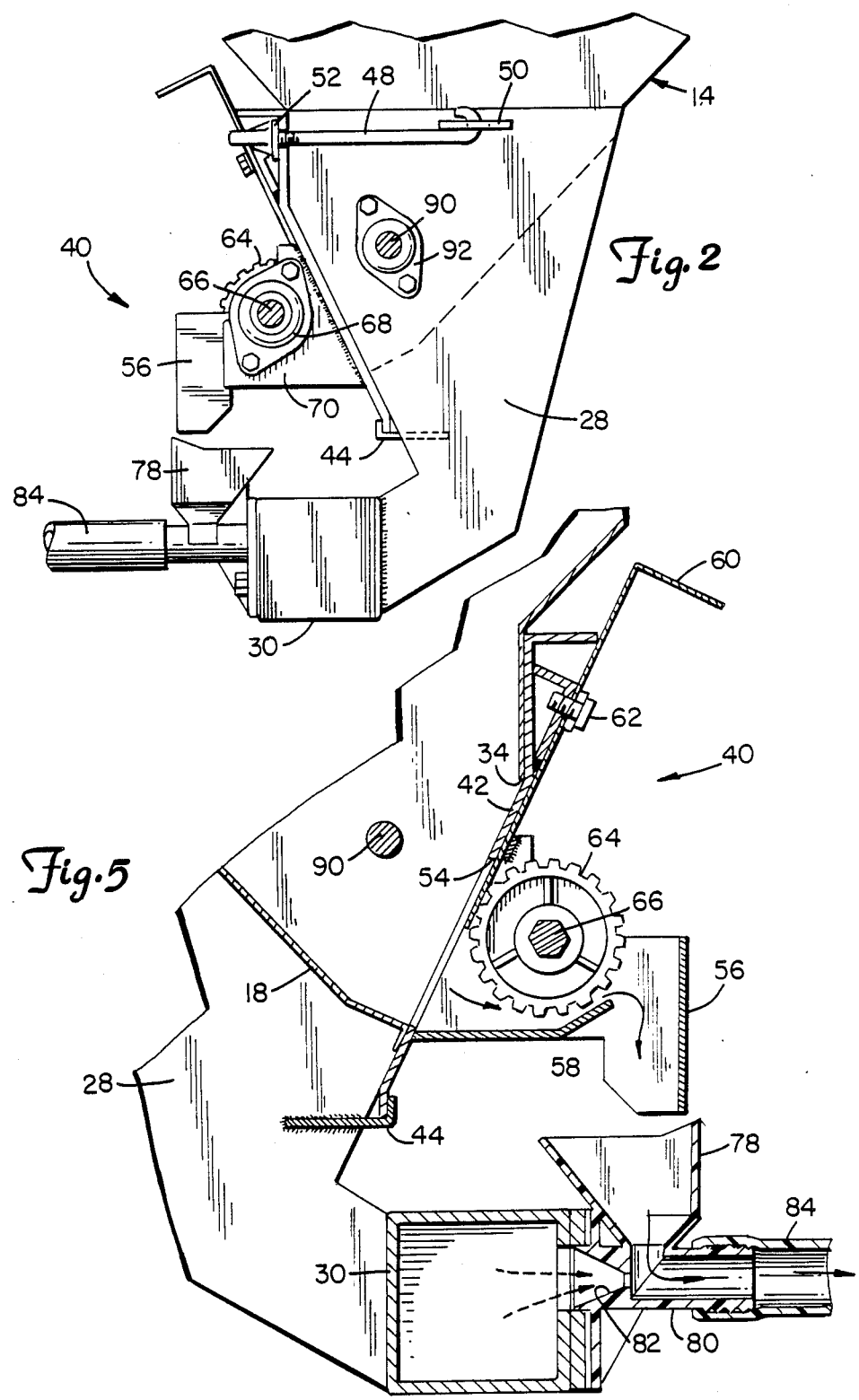

GRANULAR APPLICATOR WITH INTERCHANGEABLE METERING WHEELS

TECHNICAL FIELD

The present invention relates generally to a dispenser for granular materials such as fertilizers, pesticides, fungicides and seed. More particularly, this invention concerns a granular applicator incorporating a plurality of discharge openings with individual metering and shut-off mechanisms including an interchangeable metering wheel assembly for more precise flow control.

BACKGROUND ART

Modern-day agricultural practice requires precise application of various dry granular materials for various purposes. Such materials include fertilizers, pesticides, fungicides, herbicides and seed. For example, dry granular chemicals can be applied to the soil before, during, or after planting. Some may also be applied directly to growing plants long after the planting operation. The type of material to be applied and its application rate depend upon the plants involved, and it will be understood that the materials and application rates can vary widely. After one type of material has been applied, it may be necessary to clean out the applicator and adjust it for application of another material at a different rate.

A variety of applicators for this purpose have been available heretofore. Such applicators usually include metering apertures at the bottom of a hopper through which material is discharged by means of gravity and a feed rotor located inside the hopper above the apertures. U.S. Pat. No. 3,776,430 to the assignee hereof shows one such prior device. U.S. Pat. Nos. 3,128,921 to Henderson and 2,784,881 to Hines are also representative of the in this regard.

Although various granular applicators have been available heretofore, they have not been without certain drawbacks. The applicators of the prior art generally require complete clean-out of the hopper before the metering or feed wheels can be replaced and/or repaired, and are thus not readily adapted for efficient changeover. Material changeover and/or metering wheel changeover can be time-consuming and thus expensive with such applicators. In addition, it may not be possible to accomplish thorough cleanout without at least some disassembly. Some prior applicators are relatively complicated in construction, and are thus expensive to manufacture and difficult to maintain. Further, many of the prior applicators incorporate a relatively long, internal feed rotor together with multiple discharge openings. This arrangement is subject to inaccuracies when the unit is operated on a hill at a tilt because the material tends to collect in one side of the hopper, exposing one end of the feed rotor and thus resulting in uneven or interrupted metering at some of the discharge openings.

A need has thus arisen for a more versatile granular applicator which incorporates a removable metering assembly including interchangeable feed wheels that can be removed and replaced as necessary without emptying the hopper so that the applicator can be readily adapted for applying various granular materials.

SUMMARY OF THE INVENTION

The present invention comprises an improved applicator which overcomes the foregoing and other difficulties associated with the prior art. In accordance with the invention, there is provided a granular applicator for mounting on a planter or other implement which is typically towed or driven across a field. The applicator comprises a hopper including an open top end and closed convergent bottom end with a inclined side wall. The side wall includes a lateral opening with a metering assembly mounted therein, preferably by means of releasable fasteners for removability. The metering assembly includes a plate having a plurality of spaced-apart material discharge openings therein, individual receivers with fixed lower lips mounted over the discharge openings, individual metering wheels mounted in the receivers adjacent to the discharge openings, and individual slideable gate plates mounted between the wheels and the discharge openings.

BRIEF DESCRIPTION OF DRAWINGS

A better understanding of the invention can be had by reference to the following Detailed Description in conjunction with the accompanying Drawings, wherein:

FIG. 2 is an end view of the applicator herein;

FIG. 5 is a vertical sectional view taken along lines 5—5 of FIG. 1 in the direction of the arrows;

DETAILED DESCRIPTION

Figure 1:
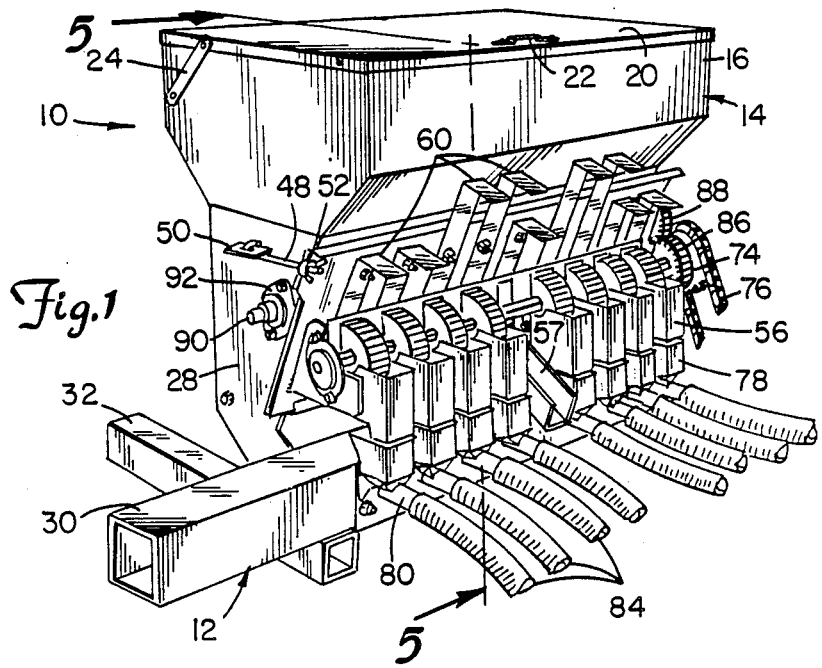
FIG. 1 is a perspective view of the granular applicator of the invention mounted on a portion of an agricultural implement.

Referring now to the Drawings, wherein like reference numerals designate like or corresponding elements throughout the views, and particularly referring to FIG. 1, there is shown the spreader or granular applicator 10 of the invention. The applicator 10 is shown mounted on a portion of an implement 12, such as a seeder or the like, drawn across a field by a tractor (not shown). Although the applicator 10 is shown mounted on a portion of an implement 12, it will be understood that the applicator can also be mounted on a truck or other vehicle which is either towed or driven across the field to dispense herbicides, pesticides, insecticides or seed. As will be explained more fully hereinafter, the applicator 10 incorporates a unique metering assembly of fewer parts and less complicated construction to effect precise distribution of desired amounts of granular materials without undue susceptibility to tilt, and which also permits changeover of the metering wheels without emptying the hopper.

Figure 3:
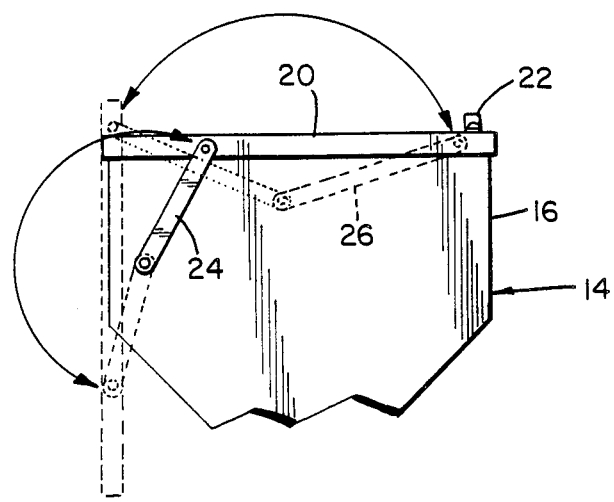
FIG. 3 is a partial end view of the hopper showing the cover in closed and open positions.
Figure 4:
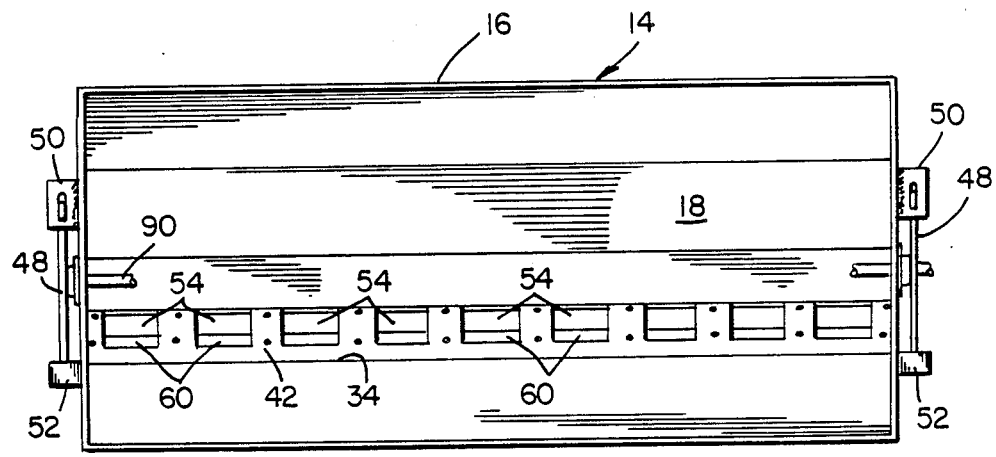
FIG. 4 is a top view of the hopper, without the cover.

The applicator 10 includes a hopper 14 with an open rectangular top end 16 and a convergent bottom end 18. A cover 20 is mounted on the top end 16 of the hopper. The cover 20 includes a handle 22 on one side thereof to facilitate opening and closing. The cover 20 can be hinged along one side thereof to the hopper 14. However, in the preferred embodiment, the cover 20 is supported by opposite pairs of pivot arms 24 and 26, only one of which is shown for movement between open and closed positions as shown in FIG. 3. This arrangement is preferable because it is easier for the operator to handle and it presents a lower profile that is less susceptible to wind gusts.

The bottom end 18 of the hopper 14 is secured between a pair of side plates 28, the lower ends of which are attached to a hollow beam 30 defining a pressurized air chamber as will be explained more fully hereinafter. The crossbeam 30 is secured, such as by U clamps or the like, to a pair of arms 32 which in turn are secured to the implement 12. It will thus be appreciated that the applicator 10 is securely mounted on the implement for movement therewith. Suitable releasable fasteners, such as U bolts and nuts are preferred so that the applicator can be adapted for mounting on a variety of implements.

The convergent bottom end 18 of hopper 14 is defined by opposing pairs of upright end walls and inclined side walls. A lateral opening 34 is provided in the side wall of relatively steeper inclination. As illustrated, the side wall in which the lateral opening 34 is located and is inclined at about 60 degrees to the horizontal.

The external metering assembly 40 is mounted over the opening 34 in the convergent bottom end 18 of the hopper 14. The metering assembly 40 includes a panel 42 adapted for closing the opening 34. The panel 42 includes a turned lower edge adapted for engagement with a ledge 44 secured between the side plates 28. Opposite side edges of the panel 42 are also turned to overlap edges of the hopper 14. The metering assembly 40 can be secured over opening 34 in any suitable fashion.

In accordance with the preferred construction, the metering assembly 40 is removably secured to the hopper 14. As illustrated, notches 46 are located at opposite sides of the upper end of panel 42 for receiving the threaded ends of bolts 48. The opposite ends of bolts 48 are turned for hooked engagement with lugs 50 secured to the side plates 28. Wing nuts 52 are provided on the bolts 48 for securing the metering assembly in place. Although a nut-and-bolt arrangement has been illustrated for purposes of releasably securing the metering assembly 40, it will be understood that other suitable connections could also be utilized. Removability, of course, facilitates maintenance of the metering assembly 40, and also facilitates cleaning of the hopper 14.

The metering assembly 40 includes individual material discharge openings, individual metering wheels, and individual shut-off valves for precise flow control and better tolerance to tilt during operation of the applicator 10. In particular, a plurality of laterally spaced-apart material disharge openings 54 are provided in the panel 42. As illustrated, nine such openings 54 are provided, although any suitable number can be utilized. A receiver 56 is normally secured over each opening 54 although, as illustrated, a spout 57 is provided over the middle opening to facilitate emptying the hopper 14. Each receiver 56 generally includes a pair of spaced-apart side walls defining a generally horizontal passageway, bounded underneath by a bottom wall which has an inclined lip 58 at its free end, as is best seen in FIG. 5, terminating adjacent to an open generally vertical passageway defined in one end of the receiver. The side walls of receivers 56 are flanged at their inner ends to facilitate mounting on panel 42 by screws or other suitable fasteners.

Individual slideable gate plates 60 are mounted between the receivers 56 and spout 57 and openings 54. The gate plate 60 for spout 57 is normally closed, while the plates for receivers 56 are normally open. Bolts 62 are provided for securing the gate plates 60 in the desired predetermined positions such as open, closed and partially opened. If desired, however, the slideable gate plates 60 could be mounted for continuous adjustment by means of bolt-and-slot connections, for example.

Figure 6:
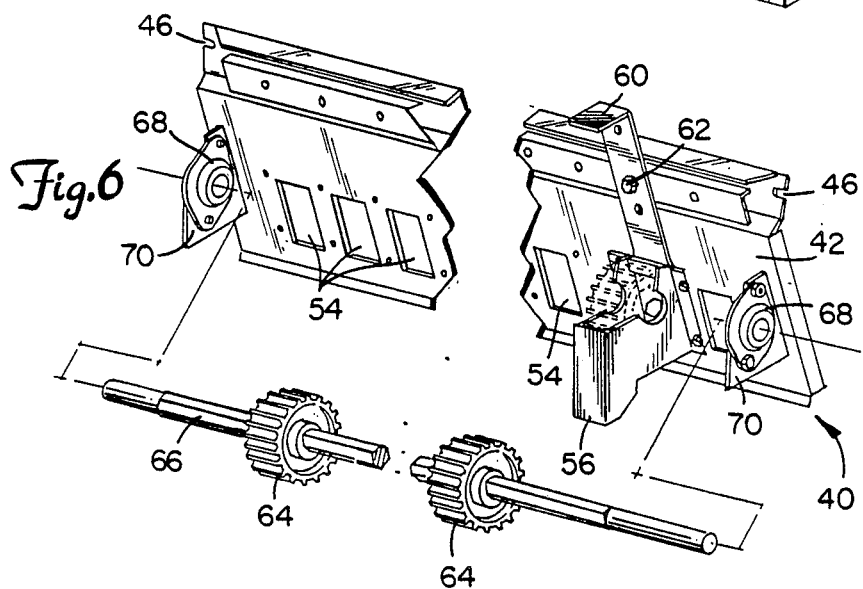
FIG. 6 is a partially exploded perspective view of the removable metering assembly of the applicator.

Individual metering wheels 64, one of which is provided for each opening 54 within the respective receiver 56, are mounted on a common shaft 66. The shaft 66 is supported for rotation between a pair of bearings 68 mounted on lugs 70 at opposite ends of panel 42. The central portion of shaft 66 is preferably noncircular or hexagonal in cross section so that the metering wheels 64 are drivingly secured thereon yet slideable along the shaft for alignment purposes. FIG. 6 illustrates in phantom lines one of the metering wheels 64 as positioned within receiver 56 when carried by shaft 66. When the metering wheels 64 are so positioned in receivers 56, the wheels do not extend into the bottom end 18 of hopper 14, but are exposed to the material in the hopper through vertical projection of the openings 54.

Figure 8:
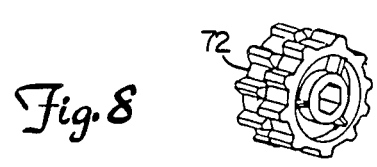
FIG. 8 is a perspective view of an alternate feed wheel in the metering assembly.
Figure 7:
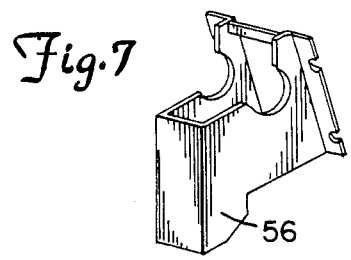
FIG. 7 is a perspective view of one of the receivers in the metering assembly.

This arrangement comprises a significant feature of the present invention. The metering wheels 64 are located outside hopper 14, yet are exposed to the material therein and can be individually isolated by means of gate plates 60 without affecting overall performance of the applicator 10. When all of the gate plates 60 are closed, the bearings 68 can be disconnected, permitting shaft 66 to be lifted away from receivers 56 so that that the metering wheels 64 can be replaced as necessary depending upon the material to be applied. As illustrated, the metering wheels 64 include straight teeth or flutes extending completely across the wheels. FIG. 8 illustrates an alternate metering wheel 72 having two circumferential rows of offset teeth. The metering wheel 72 can be used for metering relatively coarser materials. Continuous or offset straight fluted metering wheels 64 are preferred because of their positive shut-off characteristics.

The metering wheels 64 are driven in unison by means of a sprocket 74 secured to one end of the shaft 66. The drive sprocket 74 in turn is connected to a chain 76 leading to another sprocket (not shown) secured to a conventional ground engaging wheel (not shown). Such a drive arrangement compensates for the speed of travel of the implement. If desired, however, a conventional hydraulic or electric motor drive could be used instead.

The metering wheels 64 are driven in a counterclockwise direction as shown in FIG. 5, feeding material from the hopper 14 under the wheels and over lip 58, depositing the material into the generally vertical open channel portion in receiver 56 for flow by gravity into an underlying mixing chamber 78 for distribution and final application. It will thus be appreciated that the metering assembly 40 functions to carry the metered streams of material from hopper 14 into the individual mixing chambers 78.

The mixing chambers 78 are secured along the hollow frame member 30, and take the general form of a cup open at the top end which converges downwardly and opens at the bottom end into a nozzle 80. The nozzles 80 are open at their inner ends through openings in the beam 30, which is connected to a source of pressure (not shown) so that its interior is pressurized. A restriction, 82 is provided in each nozzle 80 between beam 30 and the lower ends of the mixing chambers 78 in order to create a venturi effect past the lower end of the mixing chambers, thereby entraining the granular material without blowback and carrying it down through pneumatic delivery tubes 84 to the points of application. The other end of each tube 84 can be connected to a pair of discs (not shown) for incorporation into the soil, or to a deflector (not shown) for broadcast application, in conventional fashion.

Referring again to FIG. 1, in the preferred embodiment, a gear 86 is secured to the metering wheel drive shaft 66 at one end thereof. The gear 86 is enmeshed with another gear 88 on another shaft 90 extending through the bottom end 18 of hopper 14. The shaft 90 is supported for rotation between a pair of bearings 92 on opposite sides of the hopper 14. The ratio between gears 86 and 88 can be 1:1, for example. The shaft 90, which is optional, is provided for purposes of driving a rotor or agitator (not shown) in counter direction to the metering wheel drive shaft 66 for purposes of agitating the material in the hopper to maintain flowability. It will be understood that some materials may have a greater tendency than others to bridge or clog at the bottom end 18 of the hopper, in which case it may be desirable to utilize shaft 90 for purposes of agitation.

From the foregoing, it will thus be apparent that the present invention comprises an improved granular spreader or applicator which incorporates numerous advantages over the prior art. One important advantage involves the use of a metering assembly, preferably removably secured to the hopper, which utilizes fewer parts arranged so that the metering wheels can be removed and replaced as necessary without emptying the hopper. Individual material discharge openings, individual metering wheels and individual shut-off valves are provided for more precise control and better tolerance to tilt. Other advantages will be evident to those skilled in the art.

Although particular embodiments of the invention have been illustrated in the accompanying Drawings and described in the foregoing Detailed Description, it will be understood that the invention is not limited only to the specific embodiments, but is intended to embrace any equivalents, modifications, alternatives and/or rearrangements of elements falling within the scope of the invention as defined by the following Claims.

What is claimed is:

1. A granular applicator, comprising:
    a hopper having an open top end, and a closed convergent bottom end defined in part by an inclined wall;
    the inclined wall of the convergent bottom end of said hopper including a plurality of material discharge openings therein;
    a receiver mounted over each opening in the inclined wall of the bottom end of said hopper, said receiver including a pair of spaced-apart side walls and a partial bottom wall with an inclined terminal free end;
    a fluted metering wheel disposed within each receiver between the bottom wall thereof and the associated material discharge opening in the inclined wall of the bottom end of said hopper;
    means releasably secured to said hopper for commonly supporting said metering wheels for rotation;
    a slideable gate plate mounted for movement between open and closed positions between each metering wheel and the associated material discharge opening;
    means for effecting rotation of said metering wheels to feed material between said wheel and the bottom walls of said receivers; and
    means associated with said receiver for receiving and distributing the material for application.

2. The granular applicator of claim 1, wherein said means for effecting rotation of said metering wheel comprises:
    a drive shaft supporting said metering wheel for rotation therewith;
    a driven sprocket secured to one end of said drive shaft; and
    a chain interconnecting said driven sprocket and a drive sprocket.

3. The granular applicator of claim 1, wherein said material receiving and distributing means comprises:
    an upright cup with an open top end underlying the inclined end of the partial bottom wall of said receiver; and
    a nozzle connected to the lower end of said cup and adapted for connection to a source of pressure.

4. The granular applicator of claim 1, wherein the inclined wall of the convergent bottom end of said hopper is inclined at about 60 degrees off horizontal.

5. The granular applicator of claim 1, wherein said fluted metering wheel includes one row of straight longitudinal teeth extending between opposite sides of said wheel.

6. The granular applicator of claim 1, wherein said fluted metering wheel includes two rows of straight, offset longitudinal teeth extending between opposite sides of said wheel.

7. The granular applicator of claim 1, wherein the closed convergent bottom end of said hopper is defined by two laterally spaced-apart upright end walls, and two longitudinally spaced-apart inclined side walls of different inclinations, the material discharge opening being located in the relatively steeper inclined side wall.

8. A granular applicator, comprising:
    a hopper having an open top end, and a closed convergent bottom end defined in part by an inclined wall;
    the inclined wall of the convergent bottom end of said hopper including an opening therein;
    a panel removably secured over the opening in the inclined wall of the bottom end of said hopper, said panel including a plurality of laterally spaced-apart material discharge openings therein;
    a receiver individually mounted over at least some of the openings in said panel, each receiver including a pair of spaced-apart side walls and a partial bottom wall with an inclined terminal free end;
    a fluted metering wheel mounted for rotation in each receiver between the bottom wall thereof and the respective material discharge opening in said panel;
    a gate plate mounted for movement between open and closed positions between each metering wheel and the respective material discharge opening in said panel;
    means for adjustably securing each gate plate in the desired position;
    means for effecting rotation of said metering wheels to feed material underneath said wheel and over the bottom wall of said receiver; and
    means associated with each receiver for receiving and distributing the material for application.

9. The granular applicator of claim 8, wherein said means for effecting rotation of said metering wheel comprises:
   a drive shaft supporting said metering wheel for rotation therewith;
   a driven sprocket secured to one end of said drive shaft; and
   a chain interconnecting said driven sprocket and a drive sprocket.

10. The granular applicator of claim 8, wherein said material receiving and distributing means comprises:
   an upright cup with an open top end underlying the inclined end of the partial bottom wall of said receiver; and
   a nozzle connected to the lower end of said cup and adapted for connection to a source of pressure.

11. The granular applicator of claim 8, wherein the closed convergent bottom end of said hopper is defined by two laterally spaced-apart upright end walls, and two longitudinally spaced-apart inclined side walls of different inclinations, the material discharge opening being located in the relatively steeper inclined side walls.

12. The granular applicator of claim 8, wherein the inclined wall of the convergent bottom end of said hopper is inclined at about 60 degrees off horizontal.

13. A granular applicator, comprising:
   a hopper having an open top end, and a closed convergent bottom end defined in part by an inclined wall;
   the inclined wall of the convergent bottom end of said hopper including at least one material discharge opening therein;
   a panel positioned over the opening in the inclined wall of the bottom end of said hopper, said panel including a plurality of laterally spaced-apart material discharge openings therein;
   means for releasably securing said panel to said hopper;
   a normally closed discharge spout mounted over one of the openings in said panel;
   a plurality of receivers, one mounted over each of the rest of the openings in said panel, each receiver including a pair of spaced-apart side walls and a partial bottom wall with an inclined terminal free end;
   a plurality of fluted metering wheels, one disposed in each receiver between the bottom thereof and the material discharge opening in the inclined wall of the bottom end of said hopper;
   a drive shaft supporting said metering wheels for simultaneous rotation;
   a plurality of gate plates, one mounted for movement between open and closed positions between each metering wheel and the respective material discharge opening in said panel;
   means for adjustably securing each gate plate in the desired position; and
   means for effecting rotation of said drive shaft and metering wheels to reed material between said wheel and the bottom of said receiver for distribution and application.

14. The granular applicator of claim 13, wherein the inclined wall of the convergent bottom end of said hopper is inclined at about 60 degrees off horizontal.

15. The granular applicator of claim 13, further including:
   a cover disposed over the top end of said hopper;
   a handle secured to said cover; and
   two pairs of opposing pivotal links coupled between said cover and said hopper and supporting said cover for movement between open and closed positions.

16. A granular applicator, which comprises:
   a hopper having an open top end, and a closed convergent bottom end defined in part by an inclined wall;
   the inclined wall of the convergent bottom end of said hopper including at least one opening therein;
   a cover disposed over the top end of said hopper;
   a handle secured to said cover;
   two pairs of pivotal links coupled between opposite sides of said cover and said hopper, each link of each pair of links being coupled directly between the cover and hopper at different spaced-apart points for supporting said cover for movement between open and closed positions;
   an interchangeable metering wheel assembly releasably secured to said hopper over the opening therein; and
   means associated with said metering wheel assembly for receiving and distributing the metered material for application.

17. The granular applicator of claim 16, wherein said interchangeable metering wheel assembly comprises:
   a panel having a plurality of laterally spaced apart material discharge openings therein;
   means for releasably securing said panel to said hopper;
   a receiver secured to said panel over at least some of the material discharge openings therein, each receiver including a pair of spaced apart side walls and a partial bottom wall with an inclined terminal free end;
   a metering wheel disposed in each receiver between the bottom wall thereof and the corresponding material discharge opening in said panel;
   a common drive shaft supporting said metering wheels for simultaneous rotation;
   a slideable gate plate mounted for movement between open and closed position between each metering wheel and the respective material discharge opening in said panel; and
   means for effecting rotation of said drive shaft and said metering wheels to feed material from said hopper and between said wheels and the bottom wall of said receivers.

18. The granular applicator according to claim 17, further including:
   a normally closed discharge spout secured to said panel over one of the material discharge openings therein.

19. The granular applicator of claim 16, wherein said material receiving and distributing means comprises:
   an upright cup with an open top end for receiving the metered material; and
   a nozzle connected to the lower end of said cup and adapted for connection to a source of pressure.

* * * * *